Patented May 5, 1953

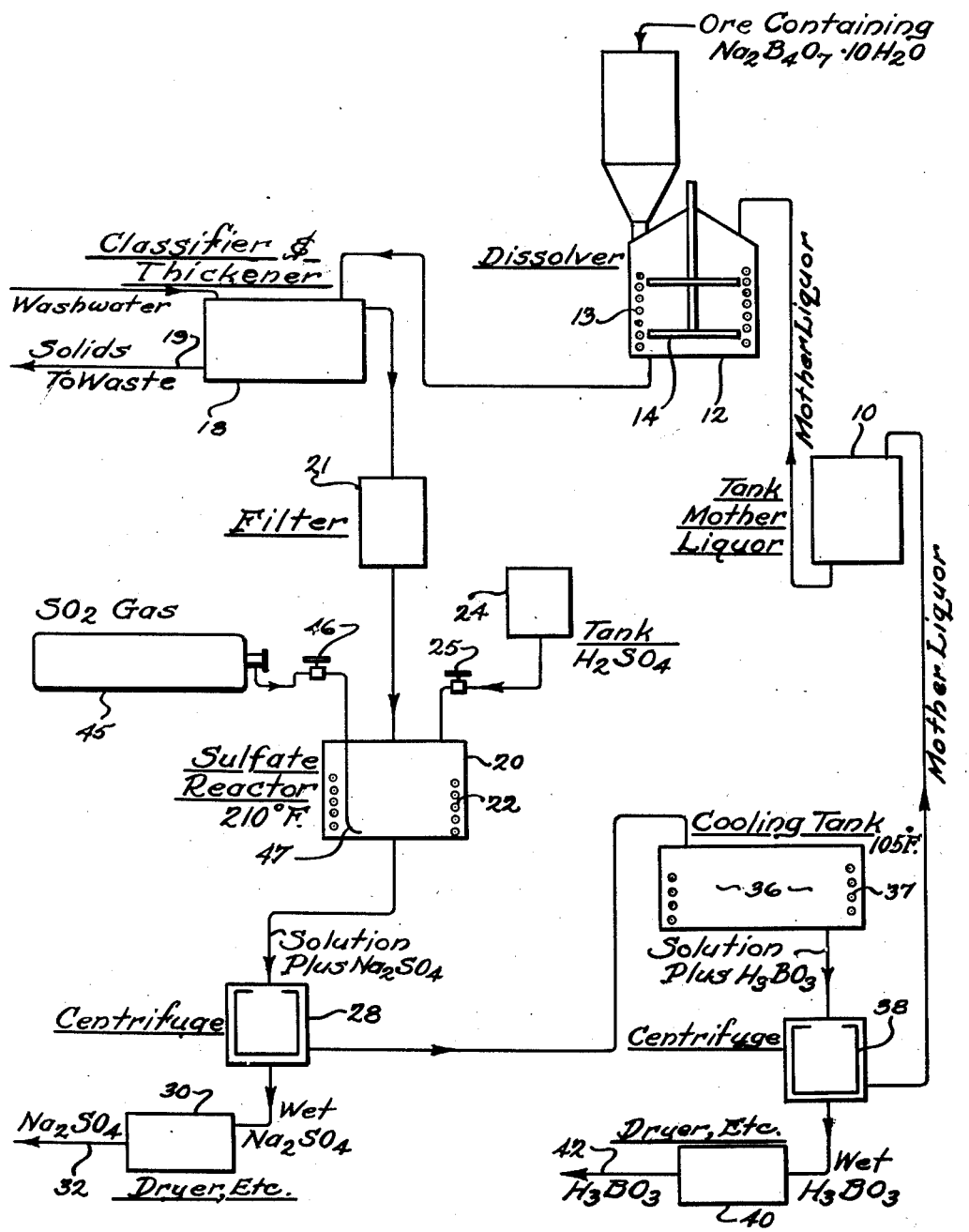

2,637,626

UNITED STATES PATENT OFFICE 2,637,626

PRODUCTION AND SEPARATION OF ANHYDROUS ALKALI METAL SULFATE AND BORIC ACID

Donald S. Taylor, Monrovia, Calif., assignor, by mesne assignments, to Borax Consolidated, Limited, London, England, a corporation of Great Britain and Northern Ireland Application July 31, 1947, Serial No. 765,095

10 Claims. (Cl. 23—121)

This invention is concerned generally with stabilized supersaturation in certain types of chemical solutions, and, more particularly, with methods of controlling such supersaturation. Although the invention is especially applicable to industrial chemical processes in which substances are separated from each other by differential precipitation from a solution, and will be illustratively described in detail in connection with a specific application of that type, it is not intended that the broader scope of the invention be limited to such use.

It has been found that under certain circumstances an acid solution containing sodium or potassium sulfate in saturating concentration can be carried appreciably beyond normal saturation, for example by evaporation of water, by change of temperature, or by chemical treatment, without causing the normal amount of sulfate precipitation, and that when a suitable reducing agent is added to such a solution that sulfate supersaturation is broken and the precipitation becomes normal. Normal behavior is also restored by decreasing the acidity of the acid solution or rendering it slightly alkaline, as by the addition of sodium hydroxide to the solution. This type of supersaturation is referred to as stabilized because it continues for an appreciable period of time even when seed crystals are present in the solution. The excess of sulfate that is retained in solution depends upon conditions, but may be 4% or more of the amount normally dissolvable.

Such stabilized supersaturation is found to accompany the presence in the acid sulfate solution of a trace of a trivalent metal ion, such as ferric iron. Addition of a reducing agent to the solution in accordance with the invention is believed to transform the ferric ions to a ferrous form, thus eliminating the ferric iron from the solution and terminating its effect. Instead of transforming the ferric iron to ferrous, the same result can be obtained by removing all iron from the solution, provided the method of removal is sufficiently effective. However, since only a few parts per million of ferric iron may be enough to cause stabilized sulfate supersaturation, it is usually preferable to control such supersaturation by conversion of the iron to ferrous form rather than by complete elimination of iron from the solution.

The effect can also be controlled by increasing the pH of the solution, rendering it less acid or preferably slightly alkaline. The ferric ions then become combined with hydroxyl ions and, whether they are precipitated as ferric hydroxide or remain in solution, they lose the property of inhibiting sulfate precipitation. Conversion of the ferric ions to ferric hydroxide can thus be considered to be a method of freeing the solution of ferric ions as such. It is indicated that much the same thing can be accomplished, that is, that the solution can be freed of ferric ions, by incorporation of the iron into an ionic complex, for example by addition of thiocyanate to the solution. In acid solution, irrespective of the particular acid involved, a substantial portion of the ferric ions are free, particularly in the sense of being uncombined with hydroxyl ions, and have the effect described.

Accordingly it is possible to distinguish between two classes of states in which dissolved iron can exist in a solution which is approximately saturated with sulfate. These are a sulfate precipitation inhibiting state, represented by the presence of free ferric ions, uncombined with hydroxyl, and occurring typically in acid solutions under oxidizing (or at least non-reducing) conditions; and a sulfate precipitation neutral state, represented by the absence of free ferric ions uncombined with hydroxyl, and occurring typically in alkaline solutions, or in solutions under reducing conditions which transform the ferric ions to ferrous form.

The practical importance of this invention will be appreciated, and a more complete understanding of its exact meaning will be gained, from the following detailed explanation of the invention as it is embodied in a typical illustrative chemical process. This explanation is to be read in conjunction with the accompanying drawing which illustrates in diagrammatic form the process, and the embodiment of the invention in it. For the sake of clarity, various well known details of the fundamental process, such as means for transferring material from place to place, are omitted from the drawing and description. The essentials of the process itself are described, for example, in United States Patent No. 1,950,106.

In the chemical process which has been selected for purposes of illustration, sodium sulfate and boric acid are obtained by differential precipitation from a mother liquor in which sodium borate has been dissolved from a suitable ore. As indicated in the drawing, mother liquor from tank 10 and ore containing substantially only water insoluble materials and borax ($Na_2B_4O_7.10H_2O$) are introduced into dissolving tank 12. Solution of the soluble ore fraction is preferably hastened by warming the tank to about 130° F., as by steam coil 13, and by agitation of the mixture by means indicated at 14. The resulting borate solution is separated from the insoluble ore fraction in classifier and thickener 18 and in filter 21, and the clear solution is taken to sulfate reactor 20. The solution is heated, as by steam coils 22, and sulfuric acid is added from tank 24 under control of valve 25 in sufficient quantity to convert all $Na_2O$ in the solution to sodium sulfate, producing an acid solution which contains primarily sodium sulfate and boric acid. The acidified solution is heated to approximately 210° F. with the result that the concentration of sodium sulfate exceeds the normal solubility at the existing temperature and causes precipitation of anhydrous sodium sulfate. The precipitate is removed from the solution, as by centrifuge 28, and is washed, dried and otherwise processed as may be required at 30, and delivered as substantially pure sodium sulfate at 32.

The remaining solution, saturated with sulfate and containing boric acid in high, but not quite saturating, concentration, is taken from centrifuge 28 to cooling tank 36, in which the temperature is lowered to about 105° F. by any suitable means, such as cold water coil 37 or evaporation of water from the solution. This increases the solubility of sulfate, which has an inverted temperature solubility curve, so that no sulfate is precipitated. But the boric acid solubility is reduced by the lowered temperature, causing boric acid to crystallize out of solution in the cooling tank. The resulting crystals are removed, as by centrifuge 38, and boric acid is washed and dried at 40 and delivered at 42. The remaining solution, which still contains sulfate and boric acid in sufficiently high concentrations to produce saturation at 210° and 105° F. respectively, is returned as mother liquor from centrifuge 38 to storage tank 10, and is available for use in a succeeding cycle.

In the operation of the process just described, it has been found that less than the theoretical amount of sodium sulfate is sometimes precipitated in sulfate reactor 20, leading to unbalanced conditions and unsatisfactory operation of the system. In extreme cases the effective yield of sodium sulfate during a cycle is reduced to as little as 20% of the theoretical yield. This condition is corrected when the process is carried out in accordance with the present invention.

A preferred procedure for carrying out the invention in this connection is the introduction directly into the solution in sulfate reactor 20 of an appropriate quantity of sulfur dioxide gas. This can be obtained, for example, from a gas cylinder, indicated at 45, and led into the solution through line 47, the flow of gas being regulated by valve means shown schematically at 46. Sulfur dioxide is absorbed by the solution and reacts with water to form sulfurous acid, the sulfite radical acting as a reducing agent. Alternatively, sodium sulfite can be added directly to the solution.

The presence of the reducing agent terminates the tendency toward sulfate supersaturation, and restores normal operation of the system. This is evidently brought about because the small amount of iron which is present in the solution as impurity is reduced from ferric to ferrous form. In practice iron tends to accumulate in the solution from three main sources, impurities in the borax-containing ore, impurities in the sulfuric acid, and corrosion of the apparatus. Under typical conditions, the total equilibrium concentration of iron in the mother liquor is of the order of 20 to 100 parts per million. Addition of about 3 lbs. of sulfur dioxide per 5000 gallons of solution processed is sufficient to insure reduction of all ferric iron present.

Other reducing agents can be used instead of sulfite. For example finely divided zinc is effective in transforming ferric to ferrous iron and can be used to terminate sulfate supersaturation caused by the presence of ferric iron. Reduction of the ferric iron can also be accomplished by electrolysis. Electrolytic reduction can be so controlled as to lead to bivalent iron, or can reduce the iron to metallic form with deposition at the electrode. In either instance the ferric iron is substantially completely removed from the solution. For convenience of description in the present specification and claims electrolytic reduction is considered to be a chemical process.

The preferred form of the invention, employing sulfite as reducing agent, has the advantage that it involves the addition to the solution of no elements which are not already present, and hence does not complicate the reactions nor introduce impurities into the final products. In general the most satisfactory reducing agent must be selected for each situation in accordance with the particular chemical requirements of the process.

The reducing agent can be added to the solution either in advance of the step of precipitation, during that step, or subsequent to that step. In the present illustrative example, sulfate precipitation is brought about in part by the increase in concentration of sulfate which results from acidification of the solution, and in part by the decrease in sulfate solubility which results from heating the solution. It is broadly immaterial whether the reducing agent is added before the solution is acidified and heated, between acidification and heating (if these steps are performed separately) or after completion of both acidification and heating. In the latter instance partial precipitation of the sulfate ordinarily takes place prior to the introduction of the reducing agent, reduction of the ferric iron then carrying the precipitation to its normal completion. In practice the preferred procedure is to carry out the heating, acidification and reduction substantially simultaneously and in the same vessel, sulfate reactor 20.

An alternative manner of obtaining normal sulfate precipitation is the removal from the solution of substantially all dissolved iron, or at least of all dissolved ferric iron. In the illustrative embodiment of the invention described above the dissolved borate has a tendency to hold the ferric iron in solution during the alkaline portion of the cycle, preventing the substantially complete precipitation of ferric hydroxide which would otherwise occur. However, such precipitation can be obtained in the described process by dilution of the alkaline solution. After filtration the resulting solution is substantially free of ferric iron and is re-concentrated, acidified and passed through the remainder of the process as before. For best results it is necessary to avoid the introduction of additional ferric iron into the solution between the step of filtration and the precipitation of sulfate. An advantage of the preferred form of the invention over the alternative form just described is the fact that contamination of the solution with iron is rendered harmless regardless of the stage of the process at which it occurs. Thus, in a process generally analogous to the present one, but in which borate is replaced by one or more other solutes which do not prevent the precipitation of ferric hydroxide during the alkaline phase of the process, it will frequently be desirable to provide a reducing agent in the acidified solution to insure reduction of any iron which enters the solution after acidification.

If it is preferred for any reason not to remove or transform the iron content of the solution, the effect of the ferric iron which is present can be minimized by carrying out the steps of acidification and sulfate precipitation in such a way that a large amount of precipitate is formed before the solution actually becomes acid. This can be accomplished, for example by raising the temperature to approximately 210° F. before the whole amount of required acid has been added. A portion of the acid required to transform all dissolved $Na_2O$ to sulfate may be added while the solution is still cool, acidification being interrupted before the solution becomes acid. The solution is then heated, reducing the sulfate solubility and precipitating the excess sulfate while the ferric iron in the solution is still in the form of ferric hydroxide. The remainder of the required acid is then added, completing transformation of the dissolved borate and producing additional sulfate precipitation from the resulting acid solution. By this procedure any effect of uncombined ferric ions is limited to the second relatively small portion of sulfate precipitated. Alternatively, the acid may be added continuously (but preferably slowly) rather than intermittently, the solution being heated either before or during the acidification and brought to approximately 210° F. before the solution becomes acid.

Another method of obtaining heavy precipitation while the solution is still alkaline is to bring the sulfate concentration substantially to saturation, as by addition of sodium sulfate to the solution, prior to acidification and preferably while the solution is still relatively cool. Under those conditions an appreciable quantity of additional sulfate can be dissolved. Then, when the solution is heated and acidified, sulfate saturation is attained relatively quickly, and an increased amount of sulfate is precipitated before the solution becomes acid. The total amount of sulfate precipitated is also increased by this procedure, equaling the normal (or net) precipitate plus the amount of sulfate that was added. This increased precipitation, by a kind of mass action, appears to overcome in large part the tendency of any dissolved ferric iron to stabilize sulfate supersaturation, with the result that the net amount of sulfate precipitated is increased and approaches the net yield that would be obtained in absence of ferric ion.

The subject-matter of the two preceding paragraphs is further described and is claimed in my copending patent application, Serial No. 298,092 filed July 10, 1952, and entitled "Production of Boric Acid and Anhydrous Sodium Sulfate," which is a continuation in part of the present application.

Returning now to the preferred form of the invention, in which the ferric iron is rendered neutral toward sulfate precipitation by reduction, the ferrous iron which results from reduction is prevented from accumulating in the solution beyond a certain concentration by the fact that an appreciable portion of the solution is lost from the process on each cycle. Some solution is carried out at 19 with the insoluble ore fraction, and a smaller quantity is adsorbed on the precipitates which leave centrifuges 28 and 38. Under given conditions of operation, the iron concentration in the mother liquor builds up to a value at which the amount of iron carried out of the system on each cycle equals that added to the system from such sources as have been suggested.

In a repetitive system which continued to accumulate iron indefinitely, it would be desirable to lower the iron concentration periodically, and this could probably best be done by oxidizing the iron back to ferric form, for example by addition of chlorine gas, and then precipitating the iron, for example with $H_2S$. By such a procedure the iron concentration could be prevented from exceeding a reasonable figure. So long as the iron is kept in ferrous form, even relatively high iron concentrations do not appear to inhibit normal precipitation of sulfate, but they increase the possibility of iron contamination of the precipitate.

The oxidation of ferrous iron to ferric form, described above as a preliminary to the precipitation of iron from the solution, can also be put to positive use in a process of the type described. For example, in each cycle through which the mother liquor is passed from tank 10 back to tank 10, the iron content of the solution can be changed to ferrous (or to ferric hydroxide) form at or ahead of sulfate reactor 20 to insure complete normal sulfate precipitation; and then changed to ferric form (uncombined with hydroxyl) at or ahead of cooling tank 36 to inhibit precipitation of sulfate during the step of boric acid precipitation. If insufficient iron is present in the solution as natural impurity, additional iron can be introduced. Such a double transformation procedure is not ordinarily necessary in a properly designed process for the differential precipitation of substances which have distinctly different temperature solubility curves, but it has the advantage of minimizing the possibility of sulfate contamination of the other chemical precipitated, for example, if the balance of the system should become temporarily disturbed. This advantage tends to be more important the more nearly similar are the temperature solubility curves of the materials treated.

I claim:

1. In a process in which boric acid and an anhydrous sulfate of an element selected from the class consisting of sodium and potassium are selectively precipitated from an aqueous and ordinarily acid solution containing boric acid and the sulfate as principal solutes, the solution also containing dissolved iron in sufficient concentration to stabilize supersaturation with respect to the anhydrous sulfate, the improvement which comprises treating the solution with a chemical agent selected from the class consisting of basic compounds that will react with the iron to produce ferric hydroxide therefrom, and reducing agents that will react to reduce ferric ions to the ferrous state, so as to substantially so react all of the dissolved iron to prevent, by transformation of the iron to such reacted state, inhibition of precipitation of anhydrous sulfate from the solution, and precipitating the anhydrous sulfate from the solution in the presence of the iron in said reacted state, said precipitation being carried out at a temperature at which the sulfate is precipitated only in anhydrous form.

2. In a process in which boric acid and an anhydrous sulfate of an element selected from the class consisting of sodium and potassium are selectively precipitated from an aqueous and ordinarily acid solution containing boric acid and the sulfate as principal solutes, the solution also containing dissolved iron in sufficient concentration to stabilize supersaturation with respect to the anhydrous sulfate, the improvement which comprises treating the solution with a basic compound that will react with the iron to produce ferric hydroxide therefrom, so as to substantially so react all of the desired iron to prevent, by transformation of the iron to such reacted state, inhibition of precipitation of anhydrous sulfate from the solution, and precipitating the anhydrous sulfate from the solution in the presence of the iron in the said state of ferric hydroxide, said precipitation being carried out at a temperature at which the sulfate is precipitaed only in anhydrous form.

3. In a process in which boric acid and an anhydrous sulfate of an element selected from the class consisting of sodium and potassium are selectively precipitated from an aqueous acid solution containing boric acid and the sulfate as principal solutes, the solution also containing dissolved iron in sufficient concentration to stabilize supersaturation with respect to the anhydrous sulfate, the improvement which comprises treating the solution with a reducing agent that will react to reduce ferric ions to the ferrous state, so as to substantially so react all of the dissolved iron to prevent, by transformation of the iron to such reacted state, inhibition of precipitation of anhydrous sulfate from the solution, and precipitating the anhydrous sulfate from the solution in the presence of the iron in said ferrous state, said precipitation being carried out at a temperateure at which the sulfate is precipitated only in anhydrous form.

4. The improvement defined in claim 3 and in which the said reducing agent is sodium sulfite.

5. The improvement defined in claim 3 and in which the said reducing agent is produced by adding sulphur dioxide to the solution.

6. In a process in which boric acid and an anhydrous sulfate of an element selected from the class consisting of sodium and potassium are selectively precipitated from an aqueous and ordinarily acid solution containing boric acid and the sulfate as principal solutes, the solution also containing dissolved iron in sufficient concentration to stabilize supersaturation with respect to the anhydrous sulfate, the improvement which comprises treating the solution with a reducing agent that will react to reduce ferric ions to the ferrous state, so as to substantially so react all of the dissolved iron to prevent, by transformation of the iron to such reacted state, inhibition of precipitation of anhydrous sulfate from the solution, and precipitating the anhydrous sulfate from the solution in the presence of the iron in said ferrous state, the said sulfate precipitation being carried out at a temperature at which the sulfate is precipitated only in anhydrous form, then treating the solution with an oxidizing agent that will react to oxidize ferrous ions to the ferric state, so as to so react an appreciable portion of the dissolved iron to produce, by transformation of iron to ferric state, inhibition of precipitation of anhydrous sulfate from acid solution, and precipitating boric acid from acid solution in the presence of the iron in the said ferric state, said boric acid precipitation being carried out at a temperature at which the sulfate would be precipitated only in anhydrous form.

7. In a cyclic process for producing anhydrous sodium sulfate and boric acid from a solution containing sodium borate and also containing dissolved iron in sufficient concentration to stabilize supersaturation with respect to anhydrous sodium sulfate, said process comprising treatment of the solution with sulfuric acid to form boric acid and sodium sulfate, precipitating anhydrous sodium sulfate from the solution at a relatively elevated temperature, removing the precipitate, precipitating boric acid from the solution at a relatively lower temperature, and removing the precipitated boric acid; the improvement which comprises treating the solution, prior to completion of the said sulfate precipitation, with a reducing agent that will react to reduce ferric ions to the ferrous state, so as to subtsantially so react all of the dissolved iron to prevent, by transformation of the iron to such reacted state, inhibition of precipitation of anhydrous sulfate from the solution, and completing the precipitation of anhydrous sodium sulfate from the solution in the presence of the iron in said ferrous state, said sulfate precipitation being carried out at a temperature at which the sulfate is precipitated only in anhydrous form.

8. The improvement defined in claim 7 and in which the said reducing agent is sodium sulfite.

9. The improvement defined in claim 7 and in which the said reducing agent is produced by adding sulphur dioxide to the solution.

10. The improvement defined in claim 7 and including treating the solution, after the step of sulfate precipitation, and prior to completion of the step of boric acid precipitation, with an oxidizing agent that will react to oxidize ferrous ions to the ferric state, so as to so react at least an appreciable portion of the dissolved iron to produce, by transformation of iron to ferric state, inhibition of precipitation of anhydrous sodium sulfate from acid solution, and completing the precipitation of boric acid from acid solution in the presence of the iron in the said ferric state, said boric acid precipitation being carried out at a temperature at which the sulfate would be precipitated only in anhydrous form.

DONALD S. TAYLOR.

References Cited in the file of this patent

UNITED STATES PATENTS

| Number | Name | Date |
|---|---|---|
| 770,963 | Gilman | Sept. 27, 1904 |
| 1,950,106 | Franke | Mar. 6, 1934 |
| 2,089,557 | Jacobi | Aug. 10, 1937 |

OTHER REFERENCES

Hackh's (1944) Chemical Dictionary, 3rd Ed; Blakiston, p. 423.

Lunge and Cumming, Sulfuric Acid and Salt Cake (1923); p. 219, D. Van Nostrand Co.